(12) United States Patent
Prohaska

(10) Patent No.: US 6,321,866 B1
(45) Date of Patent: Nov. 27, 2001

(54) HYDROSTATIC POWER DISTRIBUTION/ CONTROL LOGIC SYSTEM

(75) Inventor: James B. Prohaska, Prior Lake, MN (US)

(73) Assignee: Ag-Chem Equipment Co., Inc., Minnetonka, MN (US)

( * ) Notice: Subject to any disclaimer, the term of this patent is extended or adjusted under 35 U.S.C. 154(b) by 0 days.

(21) Appl. No.: 09/422,836

(22) Filed: Oct. 21, 1999

Related U.S. Application Data
(60) Provisional application No. 60/105,154, filed on Oct. 21, 1998.

(51) Int. Cl.$^7$ .................................................. B60K 17/356
(52) U.S. Cl. .......................... 180/307; 180/197; 180/308
(58) Field of Search ..................................... 180/197, 305, 180/307, 242, 308

(56) References Cited

U.S. PATENT DOCUMENTS

| | | | |
|---|---|---|---|
| 4,399,886 | * 8/1983 | Pollman | 180/197 |
| 5,615,748 | 4/1997 | Lansberry | 180/9.36 |
| 5,628,188 | 5/1997 | Kordak | 60/449 |
| 5,683,322 | 11/1997 | Meyerle | 475/72 |
| 5,775,453 | * 7/1998 | Williams et al. | 180/197 |
| 5,782,091 | 7/1998 | Nakajima | 60/487 |
| 5,823,072 | 10/1998 | Legner | 74/733.1 |
| 5,848,664 | * 12/1998 | Kaspar | 180/308 |
| 5,890,982 | 4/1999 | Meyerle | 475/72 |
| 5,924,509 | * 7/1999 | Ferguson et al. | 180/197 |
| 5,931,078 | 8/1999 | Kropp | 91/446 |

* cited by examiner

*Primary Examiner*—Kevin Hurley
(74) *Attorney, Agent, or Firm*—Kinney & Lange, P.A.

(57) ABSTRACT

A vehicle with a hydrostatic drive circuit assembly including a vehicle frame and a hydrostatic drive circuit. The hydrostatic drive circuit has four hydrostatic motors configured to produce a torque and cause rotation of the wheels or tracks of the vehicle, and two hydrostatic pumps adapted to distribute fluid to the hydrostatic motors. A controller is provided to signal for adjustments of torque applied to the wheels when a first wheel is rotating at a first rate and a second wheel is rotating at a second rate different than the first rate. The controller is adapted to cause adjustments to the displacement in either the motors or the pumps, and cause a change in torque in the first wheel that is substantially equal and opposite to the change in torque in the second wheel.

48 Claims, 6 Drawing Sheets

HYDROSTATIC POWER DISTRIBUTION/ CONTROL LOGIC SYSTEM

RELATED APPLICATIONS

This application claims the benefit of priority of Provisional Patent Application No. 60/105,154 entitled "Hydrostatic Power Distribution/Control Logic System," filed Oct. 21, 1998.

BACKGROUND OF THE INVENTION

The invention relates to a control system and circuit for use with a vehicle having one or more axles. More particularly, the invention relates to a hydrostatic drive circuit where a controller and hydrostatic motors and pumps are used for propelling and controlling the torque of wheels or drive tracks in a vehicle such as an agricultural vehicle, row crop sprayer, or off-road vehicle.

U.S. Pat. No. 5,931,078 entitled Hydrostatic Drive System, relates to a hydrostatic drive system with a demand-responsive pump and at least one hydraulic circuit or consumer connected to it. U.S. Pat. No. 5,890,982 entitled Continuous Hydrostatic-Mechanical Branch Power Split Transmission Particularly For Power Vehicles, relates to a hydrostatic/mechanical branch power split transmission for power vehicles. U.S. Pat. No. 5,823,072 entitled Vehicle Drive System, discloses a vehicle drive system for mobile hydraulics having a hydrostatic power transmission and a multi-speed selector gear. U.S. Pat. No. 5,782,091 entitled Hydrostatic Continuously Variable Transmission, concerns a continuously variable hydrostatic transmission including a constant displacement type swash plate hydraulic pump and a variable displacement type swash plate hydraulic motor. U.S. Pat. No. 5,683,322 entitled Continuous Hydrostatic-Mechanical Branch Power Split Transmission Particularly For Power Vehicles, relates to a hydrostatic/mechanical branch power split transmission for power vehicles. U.S. Pat. No. 5,628,188 entitled Torque Control Of Hydrostatic Machines Via The Pivot Angle Or The Eccentricity Of Said Machines, discloses a circuit arrangement for controlling the output torque of a hydrostatic machine connected to a hydraulic system having an impressed operating pressure. U.S. Pat. No. 5,615,748 entitled Earth-Based Vehicle concerns a vehicle including a main frame structure, a track assembly mounted to the main frame structure and having an single, endless ground-engaging track extending in a longitudinal direction. A pair of steerable ground-engaging wheels flank the track, and are constructed and arranged to exert a ground bearing pressure sufficient to change a direction of travel of the track in response to turning of the wheels to steer the vehicle.

The above and other documents cited herein are incorporated herein by reference in their entireties and for all purposes. They disclose systems having utility, but leaving an unmet need for a system that tends to optimally distribute torque among vehicle wheels under a variety of operating conditions.

SUMMARY OF THE INVENTION

The invention relates to a control system and hydrostatic drive circuit for controlling displacement of motors and pumps and causing adjustments in the torque of wheels or drive tracks in a vehicle. An accelerometer is used to measure fore and aft accelerations along the longitudinal axis of the vehicle. The real-time acceleration output of the accelerometer is provided as an input to the controller. This enables recognition of when the vehicle is either accelerating in a forward direction or climbing a hill or other incline, as opposed to either decelerating in the forward direction or descending a slope. In use, as a vehicle encounters mud, accelerates, or climbs hills, one or more of the wheels spins faster than the other wheels. The controller, incorporating power distribution control logic and displacement control logic, reduces the torque of the motors that are spinning faster, and increases the torque of the motors that either are not spinning or spinning at a slower speed. When this differential occurs during a forward acceleration or ascent, torque to the faster spinning motors is reduced according to a positive acceleration logic. By contrast, if the vehicle is decelerating in the forward direction or is traveling down an incline, the controller causes an increase in the torque of the motors that are spinning faster, and decreases the torque of the motors that are spinning at a slower speed or are stopped. This can be thought of as a negative acceleration logic. The accelerometer output determines whether the positive or negative acceleration logic is applied. In either event, the controller tends to maintain all wheels rotating at about the same rotational speed within a controllable or desirable tolerance while maximizing tractive effort and power distribution. The controller may be used with electronically controlled variable displacement pumps and motors and open or closed loop hydrostatic circuits. The fluid in the hydrostatic circuit is contained and carried through the hydrostatic circuit in tubes or hoses.

The invention further relates to a vehicle and hydrostatic drive circuit assembly including a frame, axle and at least one hydrostatic drive circuit. The hydrostatic drive circuit includes at least two hydrostatic motors configured to produce a torque and cause a rotation of one or more members. Wheels or tracks are operatively connected to the members. A hydrostatic pump distributes fluid to the hydrostatic motors and transfers power through the hydrostatic drive circuit. The hydrostatic drive circuit can include four motors, with each motor having a displacement during operation ranging from about 1 cc to about 10,000 cc and a hydrostatic pump having a displacement during operation ranging from about 1 cc to about 10,000 cc. The hydrostatic pump or the hydrostatic motors can include finite displacement motors. The hydrostatic motor may be a radial piston motor or an axial piston motor.

A controller causes adjustments of displacement in the motors or pumps, to change the torque applied to a wheel rotating at a first rate, and further causes adjustments of displacement in the motors or pumps to change torque applied to a second wheel rotating at a second rate different than the first rate. The adjustments in displacement and torque of the second wheel may be substantially equal and opposite to the adjustments made to the displacement and torque of the first wheel. The controller may reduce the torque of at least one of the hydrostatic motors associated with the one or more wheels rotating at a first rate, and increase the torque of at least one of the hydrostatic motors associated with the one or more other wheels rotating at the second rate if the second rate is less than the first rate. Preferably the hydrostatic motors and hydrostatic pumps each have a variable range of displacement during operation. The sum of the displacements of the hydrostatic motors and hydrostatic pumps can be substantially constant during operation.

The controller can be used to maintain a substantially fixed ground speed of the vehicle. The controller also can regulate the hydrostatic pump and the hydrostatic motors for torque distribution about the vehicle based on a comparison of the rotational speed of the hydrostatic motors, or based on a comparison of the rotational speed of the hydrostatic motors to the vehicle ground speed. The controller can have an input relating to the speed control lever position and ground speed. The inputs are monitored either sequentially or simultaneously. The controller may compare the rotational speed of the hydrostatic motors with the speed control lever position, and regulate the hydraulic drive circuit such that adjustments are made to the displacements or positions of the swashplates. In response to an indication that ground speed of the vehicle is to be reduced, the controller signals an increase of the displacement of the hydrostatic motors and a decrease of the displacement of the hydrostatic pump. In response to an indication that ground speed is to be increased, the controller signals an increase in the hydrostatic pump displacement and a decrease in the hydrostatic motor displacements. Displacements of motors and pumps preferably are adjusted after exceeding a predetermined difference in rotational speed between hydrostatic motors.

The controller, receiving an indication that a first member has a rotational speed greater than one or more of the other members, can adjust a displacement in the associated first hydrostatic motor and also adjust one or more other displacements in one or more other hydrostatic motors in an amount substantially equal and opposite to the first adjustment. The torque of the first hydrostatic motor is reduced, and a torque of a second hydrostatic motor is increased. If a wheel associated with a first motor is spinning, the displacement of a second motor is increased and the displacement of the first motor is decreased. The vehicle ground speed can be maintained substantially constant while torque is redistributed from a first hydrostatic motor to a second hydrostatic motor. The controller can monitor and adjust the torque of the hydrostatic motors associated with one or more wheels or drive tracks to compensate for weight transfer while the vehicle is traversing undulating terrain. A first hydrostatic motor may have a first torque and a second hydrostatic motor have a second torque greater than the first torque. Up to about 100% of the torque generated by the hydrostatic motor in a first portion of the vehicle may be transferred to a hydrostatic motor in a second portion of the vehicle.

The control system can include real-time monitoring of one or more inputs. The controller can be configured to adjust the displacement or swashplate position of a hydrostatic motor to maintain the rotational speeds between hydrostatic motors within a differential up to about 75%. First and second hydrostatic motors may spin faster than third and fourth hydrostatic motors. The controller can regulate the displacement of the hydrostatic pump which supplies fluid to a the first and second hydrostatic motors to maintain the rotational speeds of the first, second, third, and fourth hydrostatic motors at about the same rotational speed. Displacement of the hydrostatic motors may be increased to increase torque of the hydrostatic motors.

One or more switches may be configured to operate the hydrostatic motors at their maximum displacement. A low engine revolution per minute limit may be configured to cause an adjustment to the displacements of the hydrostatic pumps or hydrostatic motors to prevent stalling of an engine. A ground speed input may be associated with the controller for comparison with rotational speeds of the hydrostatic motors.

A steering angle input can be provided to the controller. As the steering angle is increased, the allowed rotational speed differential between the hydrostatic motors is increased. As the steering angle is decreased, the allowed rotational speed differential between the hydrostatic motors is decreased. The steering angle input and controller may be configured to maintain a distribution of torque between the hydrostatic motors and regulate an allowable differential between rotational speeds of the two hydrostatic motors, and compensate the allowable differential when the vehicle is cornering. Additional controller inputs may include a hydrostatic drive pressure, low engine revolutions per minute limit, and data from an electronically-controlled engine. The data include percent power, engine revolutions per minute, fuel rate, coolant temperature, and fuel consumption. The controller monitors the inputs and sends a signal for adjustment of a position of an engine throttle. The inputs are processed by the controller to control the distribution of torque through the hydrostatic circuit.

The vehicle may be an agricultural sprayer and include a boom position input for controlling speed of the agricultural sprayer. The vehicle may include safety interlock inputs for detection of operator presence in the cab or operator presence on the operator seat prior to operation of the hydrostatic pumps. The vehicle can include a boom fold interlock input for requiring the hydrostatic pumps to be in neutral position prior to folding and unfolding of the booms.

The invention also relates to a method of controlling a vehicle and hydrostatic drive circuit. The method includes sensing a first wheel or drive track of a vehicle rotating at a first rate greater than a second wheel or drive track and signaling at least one of a hydrostatic pump or hydrostatic motors to reduce the torque associated with one or more wheels or drive tracks rotating at a first rate and increase the torque associated with the one or more other wheels or drive tracks rotating at a second rate less than about the first rate. The method can also include adjusting the torque of the second member in an amount substantially equal and opposite to the adjustments made to the torque of the first member; controlling the hydrostatic motors such that the sum of the displacements during operation is substantially constant; controlling the hydrostatic pump such that the displacement during operation is maintained substantially constant; maintaining a substantially fixed ground speed of the vehicle; regulating the hydrostatic pump and the hydrostatic motors for torque distribution about the vehicle based on a comparison of the rotational speed of the hydrostatic motors or based on a comparison of the rotational speed of the hydrostatic motors to the vehicle ground speed; and monitoring inputs including rotational speed, displacement, swashplate position of the hydrostatic motors or the hydrostatic pump; and position of a speed control lever.

Monitoring of the inputs may occur sequentially or simultaneously. The controller can compare the rotational speed of the hydrostatic motors with the position of the speed control lever and regulate the hydraulic drive circuit such that adjustments are made to the displacements in the hydrostatic pump or the hydrostatic motors. The controller, in response to information that the ground speed of the vehicle is to be reduced, can signal an increase in the displacement of the hydrostatic motors and a decrease of the displacement of the hydrostatic pump. In response to information that the vehicle ground speed is to be increased, the controller can signal an increase of the displacement of the hydrostatic pump and a decrease of the displacement of the hydrostatic motors. The controller can be adapted to adjust displacements or swashplates to one or more positions after a predetermined difference in rotational speed between the hydrostatic motors is exceeded; identify a first member with a rotational speed greater than the other members; and adjust displacement associated with a first hydrostatic motor and adjust displacement associated with the other hydrostatic motors in an amount substantially equal and opposite.

Other objects and advantages of the present invention will become apparent to those skilled in the art from the following detailed description.

DETAILED DESCRIPTION OF THE PREFERRED EMBODIMENTS

Figure 1:
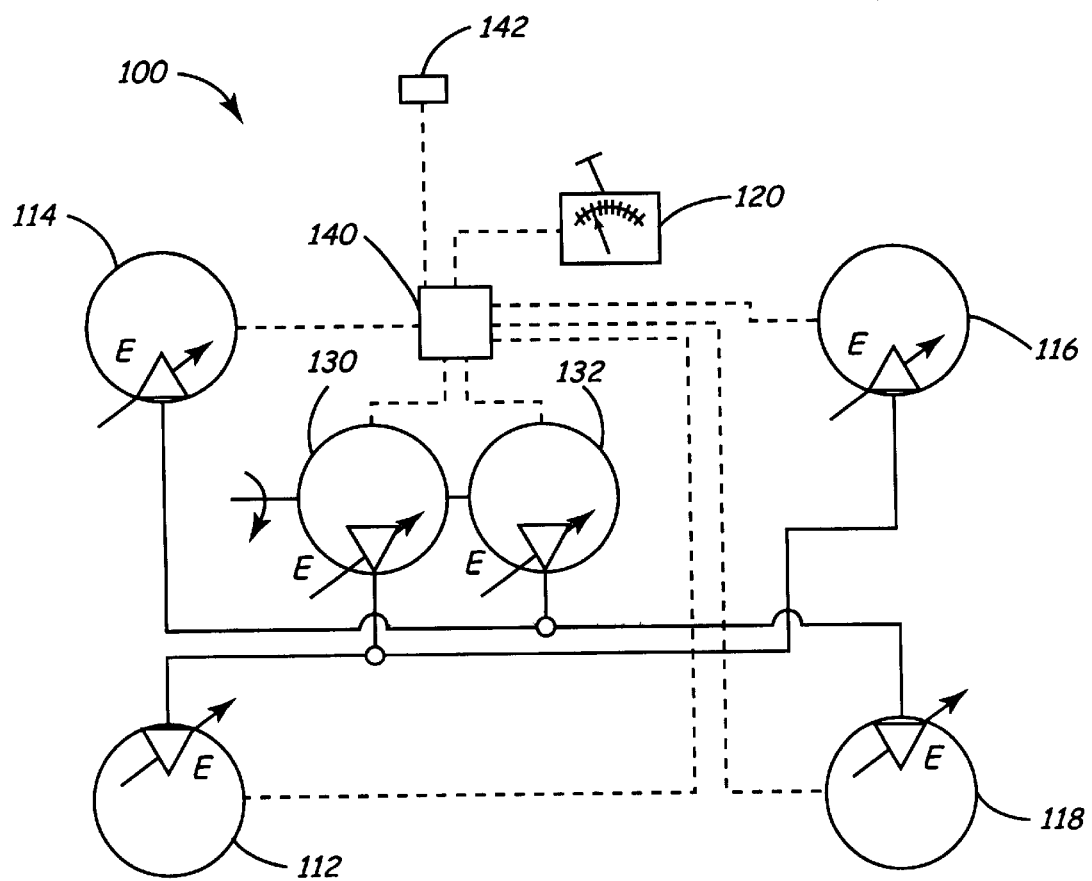
FIG. 1 is a schematic illustration of a first embodiment of a hydrostatic circuit according to the present invention.

Reference is made to FIG. 1 illustrating of one embodiment of the hydrostatic drive circuit 100 for use in a vehicle. The hydrostatic drive circuit 100 includes hydrostatic motors 112, 114, 116, 118, hydrostatic pumps 130, 132 for distribution of fluid to the hydrostatic motors 112, 114, 116, 118, and a controller 140 for controlling displacement of pumps and motors and torque distribution. An accelerometer 142 provides an input to controller 140 indicating the magnitude and direction of vehicle accelerations. The hydrostatic motors and hydrostatic pumps have a variable range of displacements during operation. The hydrostatic motors are configured to produce a torque and cause a rotation of members such as wheels or tracks associated with the hydrostatic motors.

The electronic control unit or controller 140 is configured to signal adjustments of a torque in a first member or second member when one of the first and second members is rotating at a first rate and the other member is rotating at a different second rate. While sensing amplitude and direction of acceleration along with the rotational rate differential, controller 140 causes one or more adjustments to a displacement in at least one hydrostatic motor 112, 114, 116, 118 or at least one hydrostatic pump 130, 132 and causes a change in torque in one of the first and second members that is substantially equal and opposite to the adjustment made to the torque of the other member. The controller 140 has power distribution control logic for controlling displacement of the hydrostatic motors 112, 114, 116, 118 and the hydrostatic pumps 130, 132. The controller 140 can signal a change in torque or displacement of a hydrostatic motor when two or more wheels or two or more drive tracks are rotating at different rates. The controller 140 can regulate ground speed of the vehicle. Adjustment in the displacement of the hydrostatic pumps and the hydrostatic motors and torque distribution about the vehicle can be based on sensed amplitude and direction of acceleration, and a comparison of the rotational speed of the hydrostatic motors, a comparison of the rotational speed of the hydrostatic motors and vehicle ground speed, or a comparison of the rotational speed of the hydrostatic motors with the position of the operator speed control lever 120. The controller 140 can include control logic with a real-time monitoring system for optimum performance at all ground speeds.

The controller 140 includes software to monitor inputs relating to rotational speed, displacement of the hydrostatic motors, 112, 114, 116, 118 displacement of the hydrostatic pumps 130, 132, and position of the speed control lever 120. The controller 140 also can receive ground speed data relating to the vehicle and signal an increase in the displacement of the hydrostatic motors and signal a decrease in the displacement of the associated hydrostatic pump when the ground speed is to be reduced. The controller 140 can signal an increase in the displacement of a hydrostatic pump and a decrease in the displacement of an associated hydrostatic motor when the ground speed is to be increased. The controller 140 is preferably configured to adjust the displacements in the motors or pumps after a predetermined difference in rotational speed between two hydrostatic motors is exceeded. The controller 140 identifies the member that has a rotational speed greater than one or more other members, adjusts the displacement associated with a first hydrostatic motor and adjusts the displacement of one or more other hydrostatic motors in an amount substantially equal and opposite to the first adjustment made to the first hydrostatic motor. The controller 140 can maintain a substantially constant ground speed of the vehicle while torque is redistributed from a first hydrostatic motor to a second hydrostatic motor. The controller 140 may monitor and adjust the torque of the hydrostatic motors to compensate for weight transfer and changes in tractive coefficient of friction while the vehicle is traversing undulating terrain and varying ground surface conditions. The controller 140 can regulate the displacement of the hydrostatic pump which supplies fluid to first and second hydrostatic motors and maintain the rotational speeds of the first, second, third, and fourth hydrostatic motors substantially the same when the first and second hydrostatic motors spin at a different rate than the third and fourth hydrostatic motors.

The controller 140 is programmed to monitor motor rotational speed, motor swashplate position, pump swashplate position, and position of the operator speed control lever 120 simultaneously or sequentially. The element E refers to electronic control of the displacement of a hydrostatic motor or hydrostatic pump.

The hydrostatic drive circuit 100 may include a "maintain pump displacement" mode in which the stroke or displacement of a pump 130 or 132 is held constant and displacement of a motor is varied proportionally to maintain the same total motor displacement. This mode would be useful when climbing a steep hill. Power is redistributed to the rear wheels or drive tracks and ground speed maintained, assuming adequate engine horsepower. The hydrostatic drive circuit 100 may include a "maximum torque" mode in which the pumps 130, 132 and/or motors 112, 114, 116, 118 are simultaneously controlled. This mode obtains maximum motor torque while maintaining ground speed and is a function of the position of the operator speed control lever 120 and the distribution of power based on motor speed.

As an example, of the maximum torque mode, displacement of a motor 112 ranges from about 25–50 cc with the capability of displacement increasing to 75 cc. The displacements of the motors 112, 114, 116, 118 may remain at 50 cc while the pump displacement ranges from zero to a maximum of about 100 cc. This feature provides maximum motor torque up to a precalculated speed at which engine horsepower, rather than torque, is the limiting factor. Each of the four motors 112, 114, 116, 118 can have a displacement range of 25–75 cc. and each of the pumps 130, 132 can have a displacement range 0–100 cc. A 25–50 cc range of motor displacement along with a 0–100 cc range of pump displacement provides desirable ground speeds.

The controller 140 receives inputs from the operator speed control lever 120 and the displacements or positions of swashplates from the pumps and motors, and rotational speed from each motor 112, 114, 116, 118. The operator speed control lever 120 signals a desired ground speed to the controller 140. The controller 140 compares the rotational speed of the motors 112, 114, 116, 118 with the position of the operator speed control lever 120 and adjusts displacement or swashplate angle to accomplish the desired ground speed. For the maximum torque mode, the controller 140 tends to keep the motor displacement at 50 cc and increase the stroke, displacement, or swashplate angle of the pumps 130, 132 until the maximum displacement of the pumps 130, 132 is obtained. The displacement of the motors can be decreased to obtain the desired rotational speed of the motor and ground speed of the vehicle. When ground speed of the vehicle should be reduced, the controller 140 first increases the motor displacement until maximum displacement is reached, and then decreases the displacement of the pump to obtain maximum motor torque.

The controller 140 advantageously controls wheel or track slip events. For example, if all hydrostatic motors 112, 114, 116, 118 are operating at 50 cc displacement and the pumps are at 75 cc displacement, the controller 140 is preprogrammed with a maximum allowance value relating to rotational speed difference between the motors, e.g. 1%, before the controller 140 adjusts displacement or swashplate angles. For example, if the front left motor 112 began to spin 10% faster than the other motors 114, 116, 118, the controller 140 would decrease the displacement or swashplate angle of motor 112 and increase the right rear displacement or swashplate angle (motor 116) by the same amount. This reduces the torque capability of the front left motor 112 and increases the torque capability of the right rear motor 116. Ground speed is maintained while power is redistributed to wheels or drive tracks where it can be best utilized.

This feature is especially helpful when climbing steep hills, where the front tires require reduced torque to avoid front wheel spinout and the rear wheels can use more torque due to weight transfer. As much as about 75% of the power can be transferred to the rear wheels, leaving the front wheels with about 25%. In muddy conditions, the controller 140 can adjust motor displacement as needed to keep all of the motors 112, 114, 116, 118 spinning within a preprogrammed allowable difference. If two motors are supplied oil by the same pump, and spin faster than two other motors, the controller 140 reduces the displacement or swashplate angle of that pump (the pump supplying oil to the motors spinning too fast) to maintain all four motors rotating at nearly the same speed. This feature also advantageously maximizes power distribution between the two pumps or diagonal hydrostatic circuits. In another embodiment, if two motors in one hydrostatic circuit are spinning faster than the opposite two motors, the controller 140 increases displacement of the opposite diagonal motors and decreases displacement of the spinning motors which would increase motor torque where it can be used.

The controller 140 may include a "super low" mode for maximum displacement. This mode engages all four motors 112, 114, 116, 118 into their maximum displacement for situations that may require extra torque. The hydrostatic pumps 130, 132 would have full displacement range capability. An anti-stall feature includes a preprogrammed low engine revolution per minute (RPM) limit to destroke the pumps so the engine will not be stalled. A traction control mode can be incorporated where a separate true ground speed input would be compared with motor rotational speed to limit slip. Another advantageous feature is a control logic for controlling cornering of the vehicle. For example, tire scrubbing or speed mismatch is substantially reduced by incorporating a steering angle input 164 to the controller 140 to increase the allowable difference in rotational speeds of wheels and improve cornering capabilities along with redistributing power.

Figure 2:
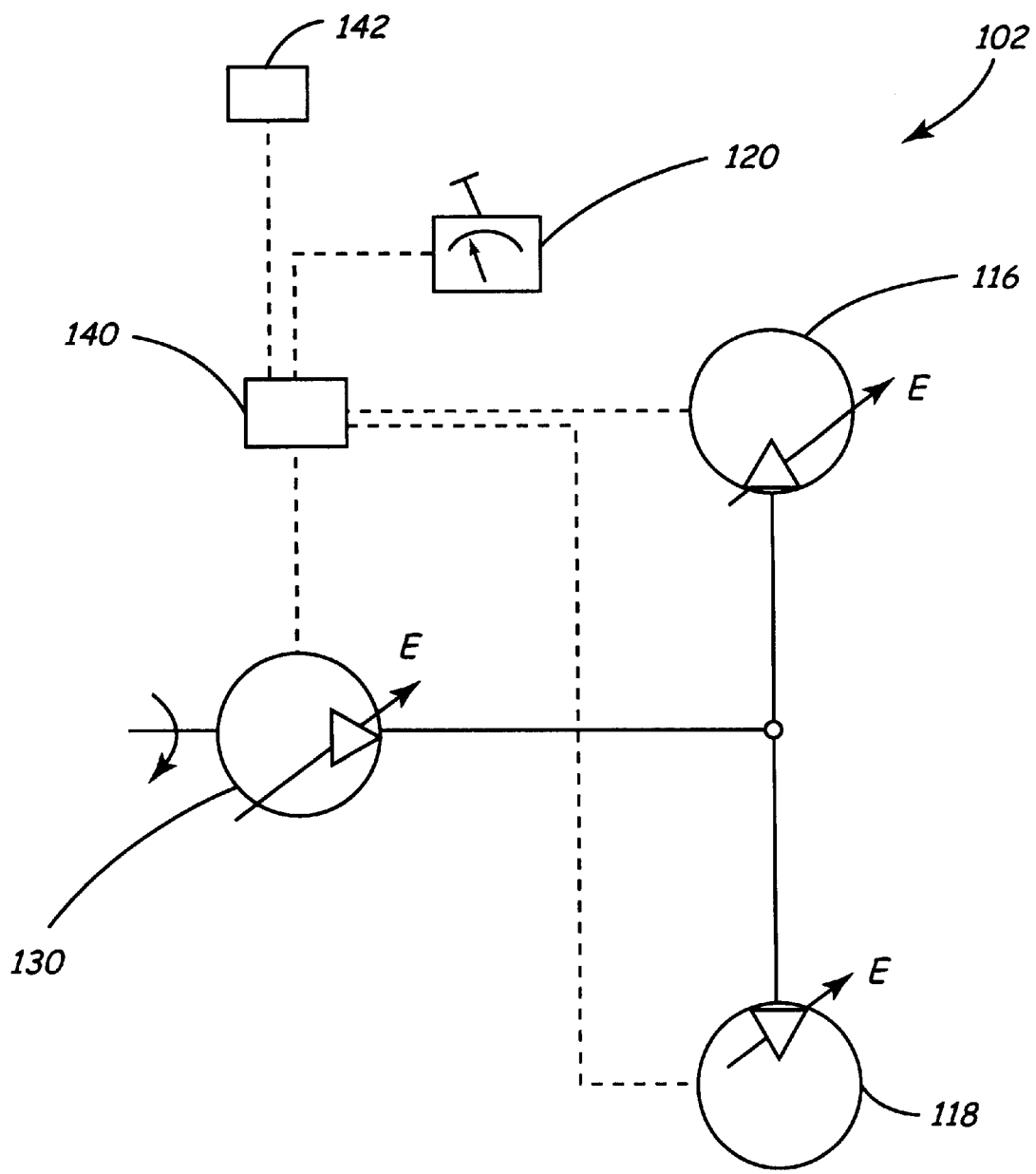
FIG. 2 is a schematic view of a second embodiment of a hydrostatic circuit.

FIG. 2 illustrates an embodiment of the hydrostatic circuit 102 including one pump 130, two motors 116, 118, controller 140, and speed control lever 120. In this embodiment, when motor 118 is rotating faster than motor 116, controller 140 will signal to decrease the displacement of motor 118 and increase, by the same amount, the displacement of motor 116.

Figure 3:
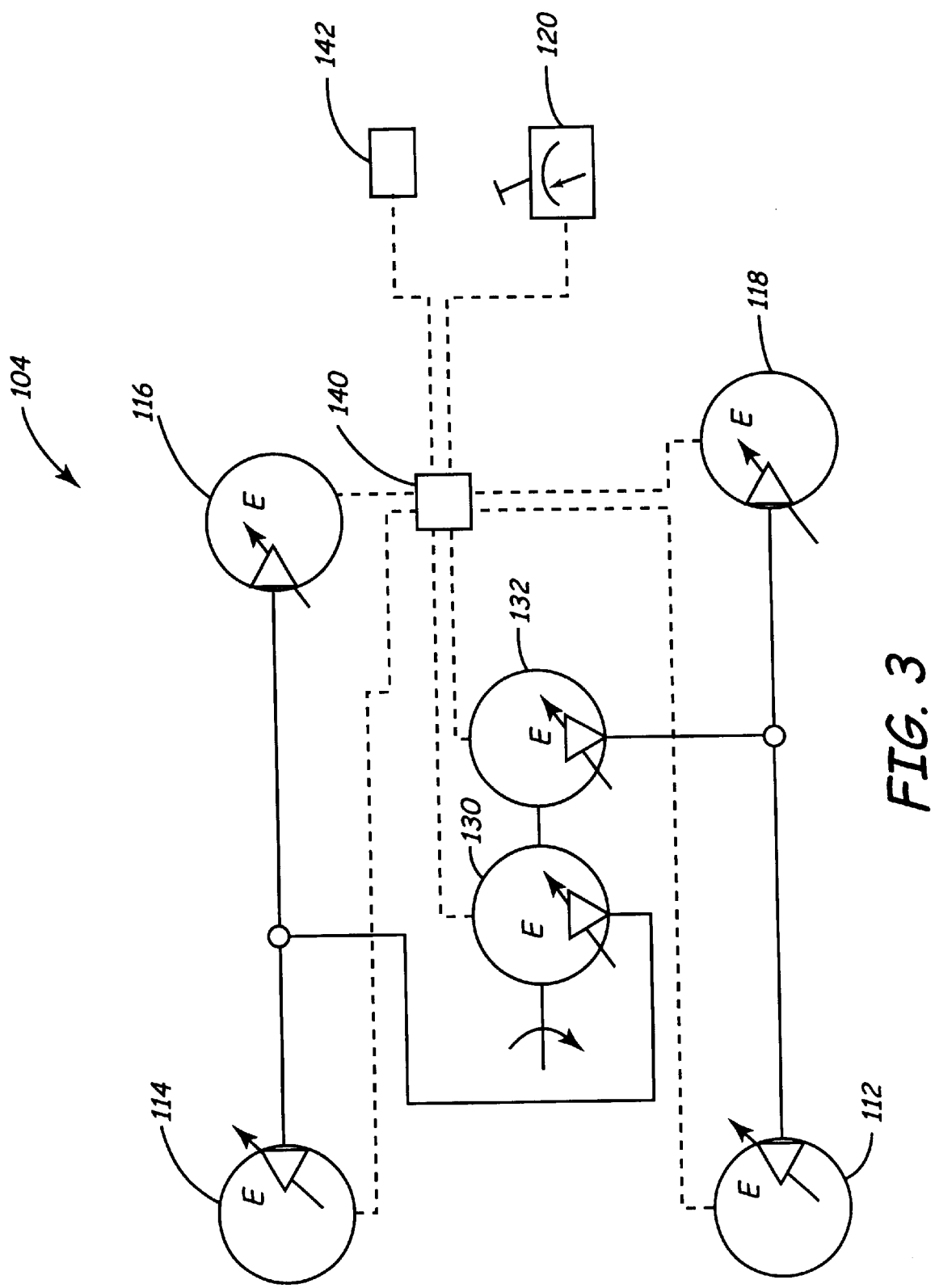
FIG. 3 is a schematic view of a third embodiment of a hydrostatic circuit.

FIG. 3 illustrates an embodiment of the hydrostatic circuit 104 including pump 130 which supplies fluid to motors 114, 116, and pump 132 which supplies fluid to motors 112, 118, controller 140, and speed control lever 120. In this embodiment, the control logic may be the same as FIG. 1 with the exception of situations where ground speed of the vehicle is to be maintained. Pump displacement is simultaneously adjusted if torque is shifted from motor 112 to motor 116. Pump 130 can receive a signal to increase displacement and pump 132 then receives a signal to equally decrease displacement. The control logic is associated per side and aligned according to the hydraulic schematic. If motor 112 is rotating faster than motor 118, controller 140 signals a decrease in displacement of 112 and an equal increase in displacement of motor 118. If motors 112, 118 are both rotating faster than motors 114, 116, controller 140 signals an equal decrease in displacement of each motor 112, 118 with a summed decrease in displacement of pump 132 to offset the decrease in motor displacement. At the same time, controller 140 can also signal an increase in the displacement of pump 130 and equal increases in the displacements of each motor 114, 116.

Figure 4:
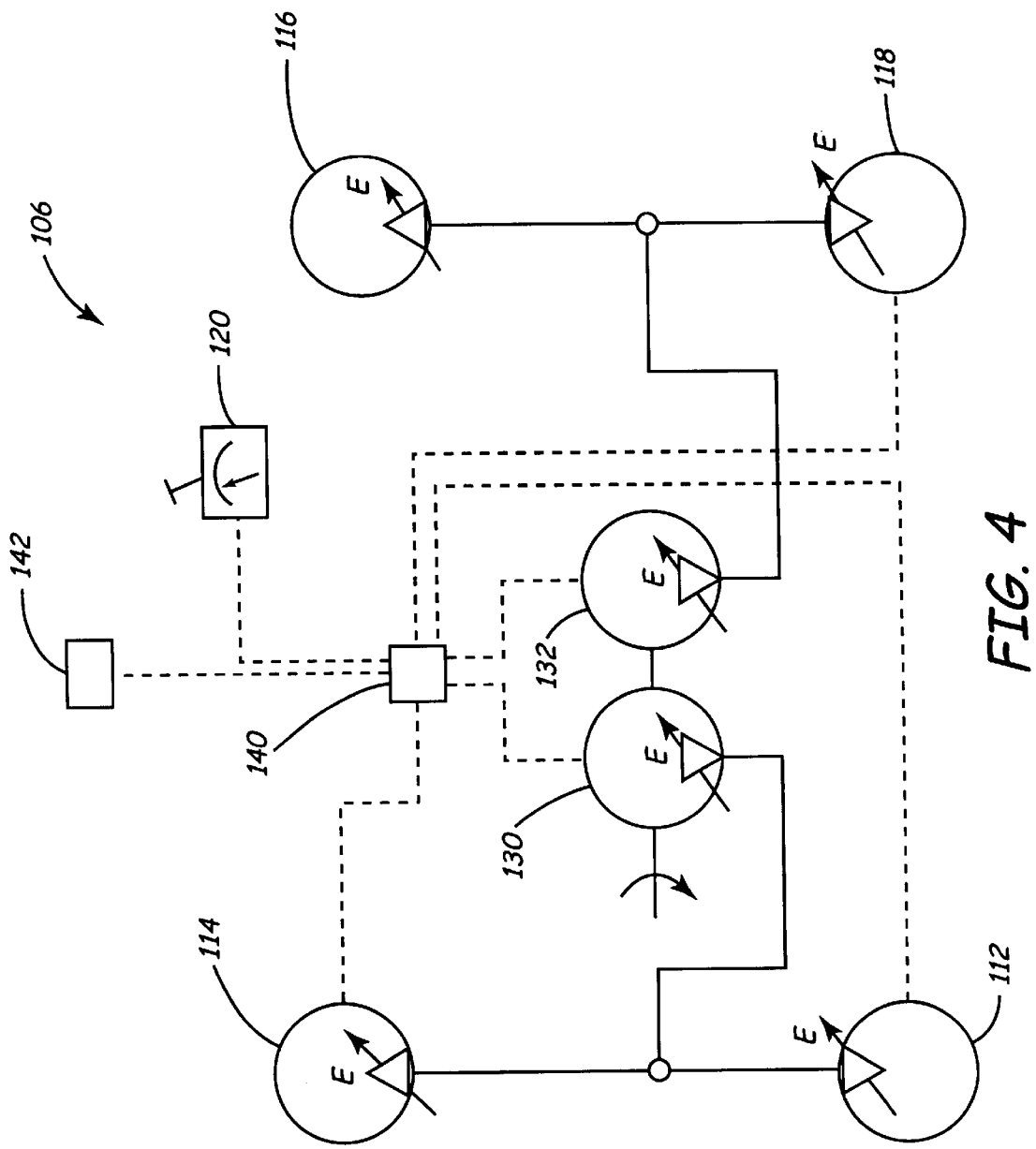
FIG. 4 is a schematic view of a fourth embodiment of a hydrostatic circuit.

FIG. 4 illustrates an embodiment of the hydrostatic circuit 106 including control logic as illustrated in FIG. 3 as applied to a front to rear hydraulic schematic.

Figure 5:
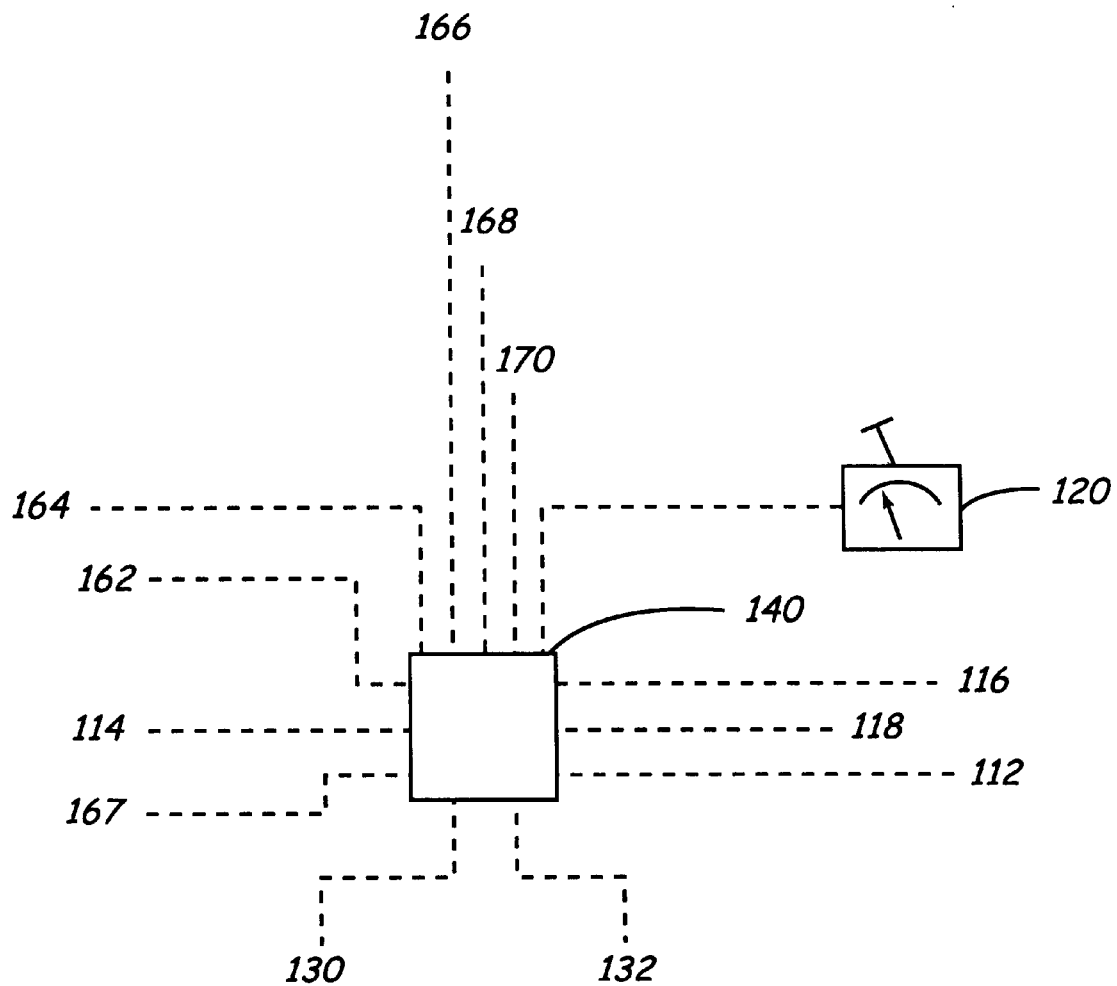
FIG. 5 is a schematic view of a controller of circuits, with multiple inputs.

FIG. 5 illustrates an embodiment of the controller 140 including inputs 164, 166, 168, 170. Other embodiments of the controller 140 and miscellaneous inputs 162 (e.g. operator presence) are also envisioned. A steering angle input 164 can be provided to a controller for changing a rotational speed differential limit between hydrostatic motors as the steering angle is changed. A ground speed input 166 is provided to controller 140 for comparison with the rotational speeds of at least two hydrostatic motors. An acceleration input 167, indicating both the magnitude and direction of acceleration, also is provided to the controller. Other inputs such as hydrostatic drive pressure, low engine revolution per minute limit, pilot pressure signal, data from an electronically-controlled engine such as percent power, engine revolution per minute, fuel rate, coolant temperature, and fuel consumption can also be provided. The controller may monitor the inputs and sends a signal for adjustment of a position of an engine throttle. On agricultural sprayers, a boom position input 168 may be associated with the controller 140 to trigger a preprogrammed top speed for field operation. Safety interlocks such as operator presence on the operator seat for agricultural sprayers may be used to prevent the hydrostatic pumps from a come on stroke until presence is detected. Another interlock might be a boom fold interlock that requires the hydrostatic pumps to be in neutral while folding and unfolding the booms on agricultural sprayers. The controller 140 may have multiple inputs to enhance its control of the hydrostatic drive. Examples of the inputs include super low drive mode and low engine RPM limit. Additional input sources may include an engine data input 170 from an electronically-controlled engine including percent power, engine RPM, fuel rate, and coolant temperature. The controller 140 may be programmed to use these inputs and send a throttle position signal back to the engine, for example, to optimize fuel consumption, engine torque, or some other performance feature.

Figure 6:
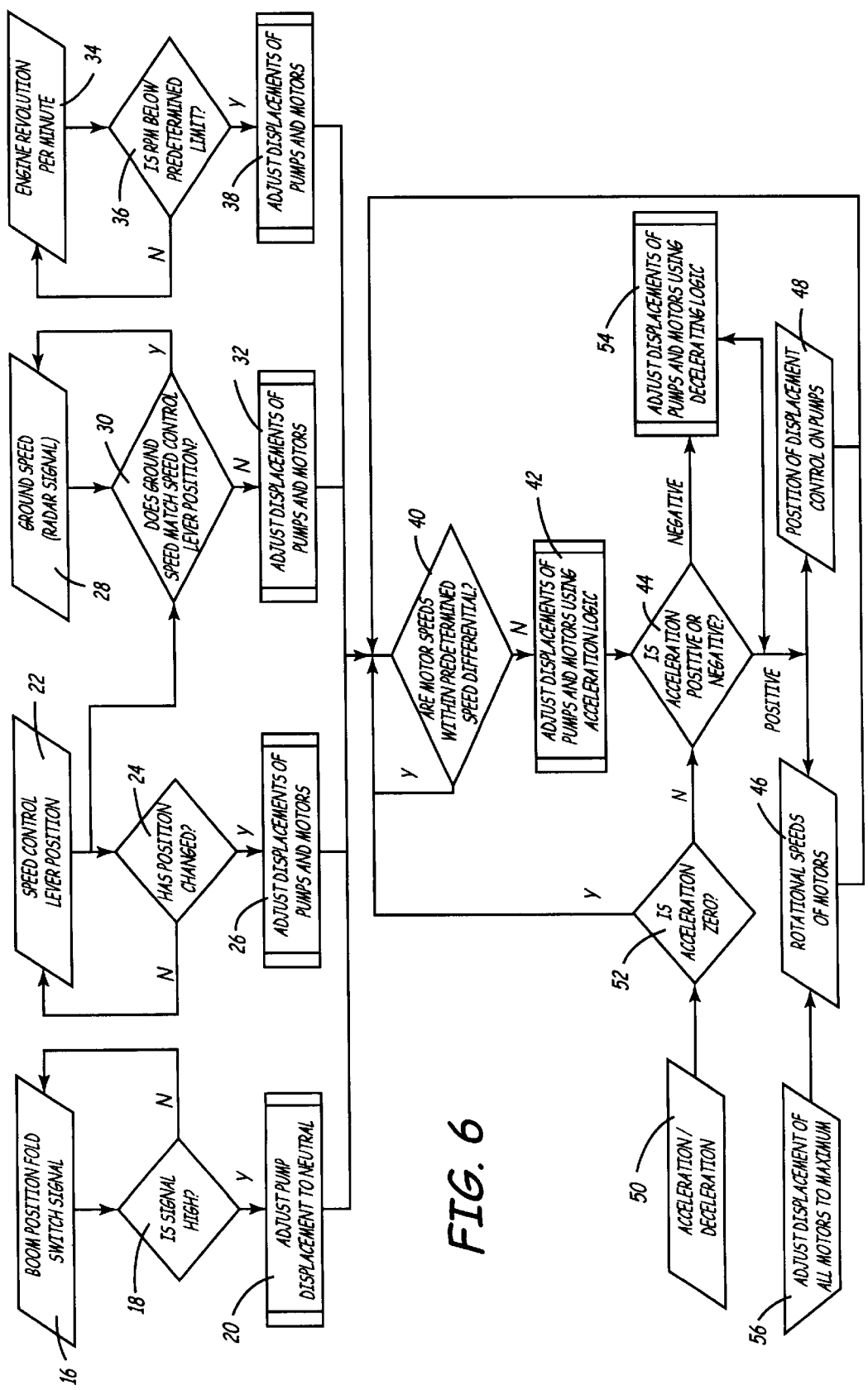
FIG. 6 is a flow chart illustrating operation of the circuits.

FIG. 6 is a flow chart that schematically illustrates the operation of any one of the previously described hydrostatic circuits. The upper portion of the flow chart illustrates several events that precede sensing hydrostatic motor speeds and adjusting pump and/or motor displacements according to the present invention. For example, a boom position fold switch signal 16 is sensed by the controller to determine whether the signal is high, i.e. whether the spray boom is powered on. If the query at 18 determines the signal is high, all hydrostatic pumps (i.e., pumps 130 and 132 in the above examples) are adjusted to a neutral or zero displacement, as indicated at 20.

The position of the speed control lever, indicated at 22, is queried at 24 to determine any change in the desired ground speed. A change indication triggers an adjustment of pump and motor displacements. In particular, an increase in desired speed leads to a pump displacement increase and motor displacement decrease. This adjustment is indicated at 26.

Controller 140 compares a ground speed signal 28 with the lever position 22 at 30, to determine whether a match has been achieved. If not, there is a further displacement adjustment as indicated at 32.

Finally, a sensed engine RPM value 34 is compared with a predetermined RPM threshold at 36. If the sensed RPM value is below the predetermined threshold, then pump and motor displacements are adjusted at 38 to prevent a stall. More particularly, pump displacements are decreased, and if necessary motor displacements are increased.

At 40, the controller logic repeatedly compares the speeds of all hydrostatic motors, specifically motors 112–118 in connection with the preceding examples, with the exception of FIG. 2 involving only motors 116 and 118.

If the motor speed differential exceeds the predetermined threshold, displacements of the hydrostatic pumps, the hydrostatic motors, or both, are indicated at 42, and torque shifting proceeds in a manner that depends on the nature of the differential, as explained above. The adjustment is subject to a query at 44 as to whether a positive acceleration or negative acceleration (deceleration) is present. In the absence of any substantial acceleration, i.e. with the vehicle traversing level ground at constant speed, controller 140 proceeds according to the positive acceleration logic. As indicated at 46 and 48, motor rotational speeds and pump displacements provided to controller 140 are, in the logic flow sense, channeled back to query 40.

An acceleration/deceleration input is indicated at 50. An acceleration is indicated if the operator increases vehicle forward speed, if the vehicle encounters and proceeds along an incline, or if there is a combination of these factors. Similarly, a deceleration is indicated by a decrease in speed and/or a descent. In either event, a non-zero acceleration is indicated at 52, and provided as an input to query 44. A deceleration, as indicated at 54, results in a shift from the accelerating logic to the decelerating logic, with the resultant difference in how displacement or torque is redistributed in response to sensing a motor speed differential that exceeds the predetermined threshold.

To appreciate the advantage inherent in sensing acceleration, it is useful to consider two examples in which the hydrostatic motors associated with the front of the vehicle, i.e. motors 112 and 114, are sensed to be rotating at a first rate faster than a second rate of motors 116 and 118 associated with the rear of the vehicle.

In the first example, the vehicle is either accelerating or proceeding uphill. According to the positive acceleration logic, the sensed differential leads to a shifting of torque away from the front wheels (or tracks) and to the rear wheels. This shift is appropriate in view of the shift in weight, in that the rear wheels bear a greater share of the vehicle weight as compared to what they support in the horizontal, constant speed condition.

Conversely, a deceleration or vehicle descent shifts vehicle weight in the opposite direction, increasing the proportion of vehicle weight borne by the front wheels. The negative acceleration (deceleration) logic causes the appropriate shift in torque, i.e. from the rear wheels to the front wheels. Most likely in this instance, the sensed differential is due to a decrease in rear wheel speed during the deceleration or descent, perhaps because of a skid.

Accordingly, the provision of the fore-and-aft acceleration information to the controller, particularly the direction of acceleration, is a salient feature of the present invention.

Returning to FIG. 6, the previously described "super low" mode for maximum displacement is indicated at 56. This is a manual control that overrides the automatic rotational speed and displacement adjustments, by adjusting all four motors to their maximum displacement. In contrast, the displacements of hydrostatic pumps 130 and 132 remain adjustable over the respective ranges, for example 0–100 cc as previously indicated. This mode of operation, while limiting torque adjustment capabilities, provides additional torque when needed.

The features of the invention described may be applied to most any mobile equipment that has a least one hydrostatic pump and at least two hydrostatic motors. The controller 140 may also be programmed to control only the motors 112, 114, 116, 118 if an electronically controlled pump is not used and a mechanically-controlled pump is used instead. Many of the same features described may be used with a mechanically-controlled hydrostatic pump.

The above described embodiments of the invention are merely descriptive of its principles and are not to be considered limiting. Further modifications of the invention herein disclosed will occur to those skilled in the respective arts and all such modifications are deemed to be within the scope of the invention as defined by the following claims.

What is claimed is:

1. A hydrostatic drive circuit assembly for use in a vehicle, the hydrostatic drive circuit assembly comprising:
   a first hydrostatic motor configured to produce a torque and cause a rotation of a first member associated with the first hydrostatic motor;
   a second hydrostatic motor configured to produce a torque and cause a rotation of a second member associated with the second hydrostatic motor;
   a first hydrostatic pump configured to distribute fluid to the first and second hydrostatic motors; and
   a controller configured to adjust a torque in the first and second members when the first member is rotating at a rate faster than a rate at which the second member is rotating, wherein the controller adjusts the torques by decreasing a displacement in the first hydrostatic motor and increasing a displacement in the second hydrostatic motor.

2. The hydrostatic drive circuit assembly of claim 1 wherein the torque in the second member is adjusted in an amount substantially equal and opposite to the adjustments made to the torque in the first member.

3. The hydrostatic drive circuit assembly of claim 1 wherein the controller includes displacement control logic adapted to control displacement of the first and second hydrostatic motors and the first hydrostatic pump.

4. The hydrostatic circuit assembly of claim 1 further comprising at least one axle.

5. The hydrostatic drive circuit assembly of claim 4 further comprising a ground engaging means associated with the at least one axle.

6. The hydrostatic drive circuit assembly of claim 1 wherein the controller is configured to signal a change in the torque of the first and second hydrostatic motors when the first and second members are rotating at different rates.

7. The hydrostatic drive circuit assembly of claim 1 wherein the first and second hydrostatic motors and the first hydrostatic pump each have a range of displacement during operation that is substantially variable.

8. The hydrostatic drive circuit assembly of claim 1 wherein the controller is adapted to regulate at least one of: (1) ground speed of the vehicle; and (2) displacement of the first hydrostatic pump and the first and second hydrostatic motors for torque distribution about the vehicle based on an amplitude and direction of vehicle acceleration in combination with at least one of: (a) a comparison of the rotational speed of the first and second hydrostatic motors; (b) a comparison of the rotational speed of the first and second hydrostatic motors and a vehicle ground speed; and (c) ground speed and a comparison of the rotational speed of the first and second hydrostatic motors with the position of a speed control lever.

9. The hydrostatic drive circuit assembly of claim 1 wherein the controller includes software adapted to monitor one or more inputs including at least one of rotational speed, displacement of the first and second hydrostatic motors, displacement of the first hydrostatic pump, and a position of a speed control lever.

10. The hydrostatic drive circuit of claim 1 and further comprising:
   a third hydrostatic motor configured to produce a torque and cause a rotation of a third member associated with the third hydrostatic motor;
   a fourth hydrostatic motor configured to produce a torque and cause a rotation of a fourth member associated with the fourth hydrostatic motor; and
   a second hydrostatic pump configured to distribute fluid to the third and fourth hydrostatic motors.

11. The hydrostatic drive circuit assembly of claim 1 wherein the controller is adapted to adjust a displacement in the first and second hydrostatic motors after a predetermined difference in rotational speed between the first and second hydrostatic motors is exceeded.

12. The hydrostatic drive circuit assembly of claim 1 wherein the controller is configured to identify when the first member has a rotational speed greater than the second member and adjust a displacement associated with the first and second hydrostatic motors, wherein adjusting the displacement of the first and second hydrostatic motors comprises adjusting the second hydrostatic motor in an amount substantially equal and opposite to an adjustment made to the first hydrostatic motor.

13. The hydrostatic drive circuit assembly of claim 10 wherein the controller is adapted to maintain a substantially constant ground speed of the vehicle by redistributing torque among the hydrostatic motors.

14. The hydrostatic drive circuit assembly of claim 19 wherein the controller is configured to monitor and adjust the torque of the hydrostatic motors to compensate for weight transfer and changes in a tractive coefficient of friction while the vehicle is traversing undulating terrain and varying ground surface conditions.

15. The hydrostatic drive circuit assembly of claim 10 wherein up to about 100% of the torque generated by at least one hydrostatic motor in a first portion of the vehicle is transferable to at least one hydrostatic motor in a second portion of the vehicle.

16. The hydrostatic drive circuit assembly of claim 10 wherein the controller is configured to adjust a displacement of at least one hydrostatic motor to maintain the rotational speeds of the first, second, third, and fourth hydrostatic motors within up to about 75% of each other.

17. The hydrostatic drive circuit assembly of claim 10 wherein the controller is configured to regulate the displacement of the first and second hydrostatic pumps to maintain the rotational speeds of the first, second, third, and fourth hydrostatic motors at substantially the same rotational speed when hydrostatic motors associated with a first portion of the vehicle spin at a rate different than hydrostatic motors associated with a second portion of the vehicle.

18. The hydrostatic drive circuit assembly of claim 10 further comprising a ground speed input associated with the controller for comparison with the rotational speeds of at least two hydrostatic motors.

19. The hydrostatic drive circuit assembly of claim 10 further comprising a steering angle input associated with the controller wherein as the steering angle is changed, the rotational speed differential between at least two hydrostatic motors is changed.

20. The hydrostatic drive circuit of claim 1 further comprising one or more inputs including a hydrostatic drive pressure, low engine revolution per minute limit, steering angle input, pilot pressure signal, data from an electronically-controlled engine such as percent power, engine revolution per minute, fuel rate, coolant temperature, fuel consumption, and vehicle acceleration.

21. The hydrostatic drive circuit of claim 20 wherein the controller monitors the one or more inputs and adjusts a position of an engine throttle based on the one or more inputs.

22. The hydrostatic drive circuit assembly of claim 10 wherein the controller is adapted to receive ground speed data relating to the vehicle and is adapted to signal an increase in the displacement of hydrostatic motors associated with a first portion of a vehicle and signal a decrease in a displacement of hydrostatic motors associated with a second portion of the vehicle when the ground speed is to be decreased, and wherein the controller is adapted to signal a decrease in the displacement of the hydrostatic motors associated with the front of the vehicle and signal an increase in a displacement of the hydrostatic motors associated with the rear of the vehicle when the ground speed is to be increased.

23. The hydrostatic drive circuit assembly of claim 22 wherein the controller is further adapted to signal a decrease in the displacement of the hydrostatic pump when the ground speed is to be decreased and signal an increase in the displacement of the hydrostatic pump when the ground speed is to be increased.

24. A method of controlling a hydrostatic power distribution in a vehicle having a hydrostatic drive circuit, the method comprising:

sensing a first wheel of a vehicle rotating at a first rate different than a rate at which a second wheel is rotating;

adjusting a torque associated with the first wheel that is rotating at a first rate; and adjusting a torque associated with the second wheel that is rotating at a rate different than the first rate in an amount substantially equal and opposite to the adjustment made to the torque of the first wheel.

25. The method of controlling the hydrostatic power distribution in a vehicle of claim 24 wherein adjusting a torque associated with the first and second wheels comprises controlling a hydrostatic motor associated with each wheel so that the sum of the displacements of the motors during operation of the vehicle is substantially constant when no change in or speed lever input is realized.

26. The method of controlling the hydrostatic power distribution in a vehicle of claim 25 and further comprising controlling a supply of fluid to the hydrostatic motors from a hydrostatic pump so that the displacement during operation of the vehicle is maintained substantially constant during changes in torque.

27. The method of controlling the hydrostatic power distribution in a vehicle of claim 26 further comprising maintaining a substantially fixed ground speed of the vehicle.

28. The method of controlling the hydrostatic power distribution in a vehicle of claim 27 further comprising regulating the hydrostatic pump and at least two hydrostatic motors for torque distribution about the vehicle based on a comparison of the rotational speed of the at least two hydrostatic motors.

29. A hydrostatic power distribution assembly for use in a vehicle, the hydrostatic power distribution assembly comprising:

a plurality of hydrostatic motors configured to produce a torque and cause a rotation of a plurality of ground engaging means;

hydraulic pump means configured to distribute fluid to the plurality of hydrostatic motors;

means for determining an acceleration of the vehicle;

means for sensing a rotation rate of each of the plurality of hydrostatic motors; and a controller configured to adjust a torque of at least one of the plurality of ground engaging means based on the acceleration of the vehicle and the sensed rotation rates, wherein the torque is adjusted so that all ground engaging means rotate at about a desired rotational speed.

30. The hydrostatic power distribution assembly of claim 29 wherein the plurality of hydrostatic motors comprises a first hydrostatic motor configured to produce a torque and cause a rotation of a first ground engaging means, and a second hydrostatic motor configured to produce a torque and cause a rotation of a second ground engaging means.

31. The hydrostatic power distribution assembly of claim 30 wherein the means for sensing a rotation rate comprises means for sensing a first rotation rate of the first hydrostatic motor and means for sensing a second rotation rate of the second hydrostatic motor.

32. The hydrostatic power distribution assembly of claim 30 wherein the controller adjusts a displacement to the first and second hydrostatic motors when the first rotation rate is not equal to the second rotation rate.

33. The hydrostatic power distribution assembly of claim 31 wherein the controller adjusts a displacement in the second hydrostatic motor in an amount equal and opposite an adjustment made to the displacement in the first hydrostatic motor.

34. The hydrostatic drive circuit assembly of claim 30 wherein the plurality of hydrostatic motors further comprises a third hydrostatic motor and a fourth hydrostatic motor.

35. The hydrostatic power distribution control assembly of claim 29 wherein the plurality of hydrostatic motors comprises two motors associated with a first portion of the vehicle and two motors associated with a second portion of the vehicle.

36. The hydrostatic power distribution control assembly of claim 35 wherein the controller is configured to adjust the torque of the plurality of ground engaging means according to positive acceleration logic when the vehicle is accelerating.

37. The hydrostatic power distribution control assembly of claim 36 wherein the controller is configured to increase a displacement of the motors associated with the first portion of the vehicle and decrease a displacement of the motors associated with a second portion of the vehicle.

38. The hydrostatic power distribution control assembly of claim 37 wherein the controller is configured to adjust the torque of the plurality of ground engaging means according to negative acceleration logic when the vehicle is decelerating.

39. The hydrostatic power distribution control assembly of claim 38 wherein the controller is configured to decrease a displacement of the motors associated with the first portion of the vehicle and increase a displacement of the motors associated with a second portion of the vehicle.

40. A method of controlling the hydrostatic power distribution in a vehicle, the method comprising:

sensing an amplitude and direction of acceleration of the vehicle;

determining a rotational speed of a hydrostatic motor associated with each wheel of the vehicle;

determining a displacement of a hydrostatic pump supplying fluid to a hydrostatic motor; and adjusting a displacement of the hydrostatic motors based on the sensed amplitude and direction of acceleration, the rotational speed of the motors, and the displacement of the pump.

41. The method of claim 40 wherein adjusting a displacement of the hydrostatic motors comprises controlling the displacement based on positive acceleration logic.

42. The method of claim 41 wherein controlling the displacement based on positive acceleration logic comprises shifting torque away from front wheels of the vehicle to rear wheels of the vehicle.

43. The method of claim 42 wherein controlling the displacement based on positive acceleration logic further comprises reducing the displacement of the hydrostatic motors associated with the wheels of the front of the vehicle and increasing the displacement of the hydrostatic motors associated with the wheels of the rear of the vehicle.

44. The method of claim 43 and further comprising increasing a displacement of the hydrostatic pump.

45. The method of claim 40 wherein adjusting a displacement of the hydrostatic motors comprises controlling the displacement based on negative acceleration logic.

46. The method of claim 45 wherein controlling the displacement based on negative acceleration logic comprises shifting torque away from rear wheels of the vehicle to front wheels of the vehicle.

47. The method of claim 46 wherein controlling the displacement based on negative acceleration logic further comprises increasing the displacement of the hydrostatic motors associated with the wheels of the front of the vehicle and decreasing the displacement of the hydrostatic motors associated with the wheels of the rear of the vehicle.

48. The method of claim 47 further comprising decreasing a displacement of the hydrostatic pump.

* * * * *